Dec. 20, 1949  L. WILKERSON  2,491,885
LAWN MOWER ATTACHMENT
Filed June 20, 1947
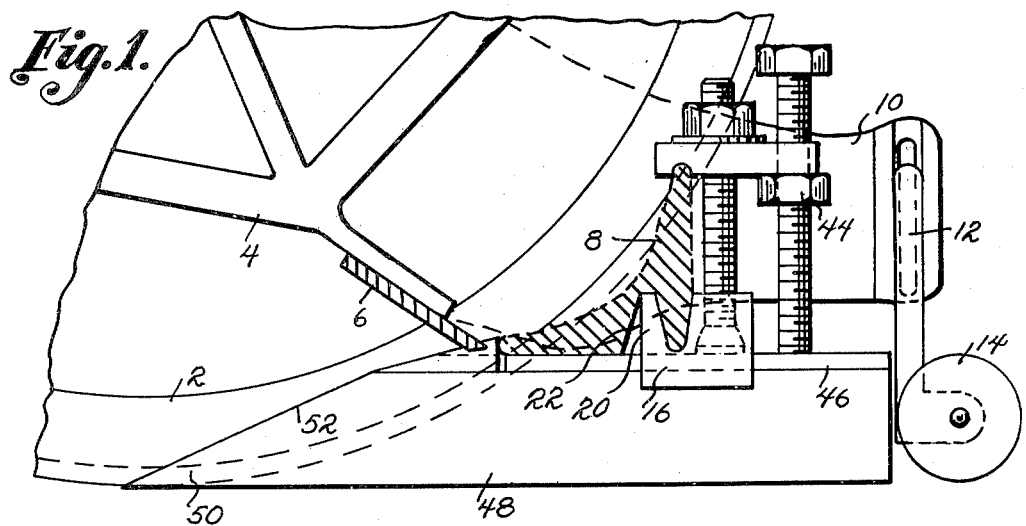
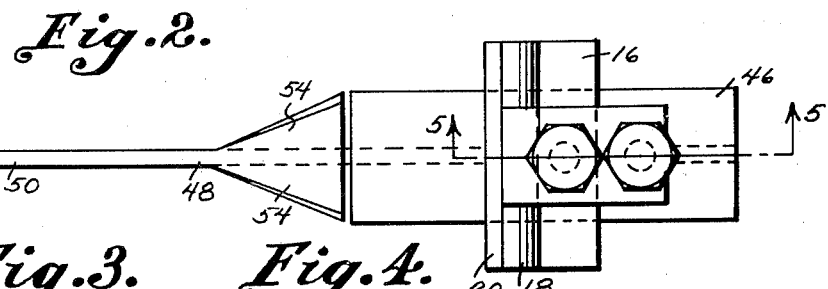
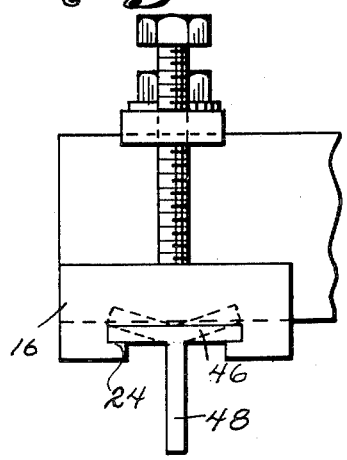 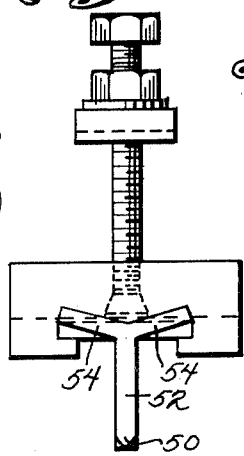 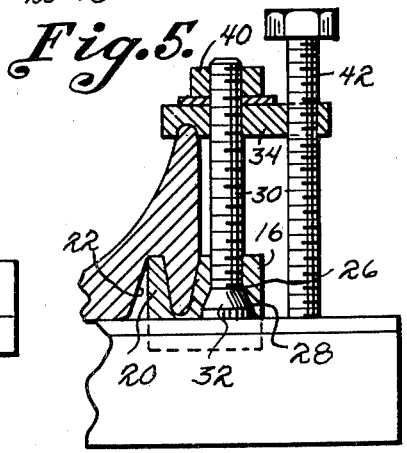
INVENTOR.
Louie Wilkerson
BY *Victor J. Evans & Co.*
ATTORNEYS Patented Dec. 20, 1949

2,491,885

UNITED STATES PATENT OFFICE 2,491,885

LAWN MOWER ATTACHMENT

Louie Wilkerson, Pine Bluff, Ark.

Application June 20, 1947, Serial No. 755,882

1 Claim. (Cl. 56—312)

My present invention relates to an improved lawn mower attachment of the type designed for use with the conventional reel type of mower, and adapted to be mounted on the cutter bar of the mower so as to lift into the path of the cutting reel, the grass lying over a side walk and which the mower cannot ordinarily cut because the grass is lying horizontally in a plane below the reel.

The attachment of my invention may be secured to any standard mower and the blade having a rearwardly inclined surface will run under the blades of grass, elevating them into the path of the cutting reel.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a side elevational view of the attachment of my invention mounted on a mower.

Fig. 2 is a top plan view of the device.

Fig. 3 is a rear elevational view.

Fig. 4 is a front elevational view.

Fig. 5 is a sectional view at line 5—5 of Fig. 2.

Referring now to the drawings, I have shown the present preferred embodiment of my invention as used with a standard rotary reel mower including the wheel 2, and the spider frame reel 4 with the cutter 6 co-acting with the cutter bar 8 extending between the supports 10 and adjustably secured at 12 on the roller 14.

Beneath the cutter bar, the usual knife blade, not shown, is adjustably mounted and the reel cutters swing past the cutter bar and knife severing standing blades of grass.

In order to elevate grass blades overlying side walls and the like, I employ an adapter 16 comprising a solid metal block with a horizontal groove 18 forming a tongue 20 located with the groove 22 of the cutter bar and having a mortised slot 24, and a vertically disposed aperture 26 countersunk at 28. A screw 30 has a collar 32 fitting into the aperture 26 and extends vertically to the rear of the cutter bar, and a clamp block 34 is grooved at 36 to rest on the upper edge of the cutter bar. A washer 38 and a nut 40 secure the clamp block, and a set screw 42 has a lock nut 44 and bears against the flat top flange 46 of the elevating blade 48.

The flange is slidably mounted in the mortised slot of the adapter and the nose 50 of the blade inclines rearwardly at 52 to the diverging wings 54 which are angularly disposed with relation to each other above the horizontal plane.

The attachment is normally mounted on the cutter bar near one end and as the mower is pushed forwardly the nose of the blade may be directed along the edge of the walls, the inclined nose elevating the blades and the wings spreading the blades into the path of the reel.

By the use of the mower attachment the tedious and laborious hand trimming of walk edges will be eliminated and the entire mowing operation may be accomplished by machine.

Having thus fully described my invention what I claim as new and desire to secure by Letters Patent is:

A detachable tine bar for use with a mower having a fixed cutter bar and a rotary cutting reel, comprising a vertically disposed blade having a straight bottom edge and tapered nose inclining rearwardly from the forward end of the blade for elevating horizontally disposed grass blades, and rearwardly diverging upwardly angled wings on the blade rearwardly of the nose for spreading the grass blades into the path of the reel, a horizontally disposed flange on the blade rearwardly of the wings, and means cooperating with said flange and said cutter bar to detachably mount said blade on said cutter bar, and said last said means comprises a block member having a tongue portion adapted to engage the bottom of said cutter bar, a mortised slot in the bottom of said block member to receive the flange on said blade, and a clamp bar carried by said block and adapted to engage the top of said cutter bar whereby said blade is secured to said bar so that said blade extends forwardly of said bar.

LOUIE WILKERSON.

REFERENCES CITED

The following references are of record in the file of this patent:

UNITED STATES PATENTS

| Number | Name | Date |
|---|---|---|
| 404,691 | Deland | June 4, 1889 |
| 1,225,380 | Warren | May 8, 1917 |